United States Patent
Shibuya

(10) Patent No.: US 9,529,166 B2
(45) Date of Patent: Dec. 27, 2016

(54) OPTICAL RECEPTACLE AND OPTICAL MODULE PROVIDED WITH SAME

(71) Applicant: ENPLAS CORPORATION, Kawaguchi-shi, Saitama (JP)

(72) Inventor: Kazutaka Shibuya, Kawaguchi (JP)

(73) Assignee: ENPLAS CORPORATION, Kawaguchi-Shi (JP)

( * ) Notice: Subject to any disclaimer, the term of this patent is extended or adjusted under 35 U.S.C. 154(b) by 128 days.

(21) Appl. No.: 14/382,503

(22) PCT Filed: Feb. 20, 2013

(86) PCT No.: PCT/JP2013/054103
§ 371 (c)(1),
(2) Date: Sep. 2, 2014

(87) PCT Pub. No.: WO2013/136925
PCT Pub. Date: Sep. 19, 2013

(65) Prior Publication Data
US 2015/0078713 A1    Mar. 19, 2015

(30) Foreign Application Priority Data

Mar. 16, 2012 (JP) ................... 2012-060193

(51) Int. Cl.
*G02B 6/42* (2006.01)
*G02B 27/10* (2006.01)
*G02B 27/12* (2006.01)

(52) U.S. Cl.
CPC ........... *G02B 6/4286* (2013.01); *G02B 6/4204* (2013.01); *G02B 6/4214* (2013.01); *G02B 6/4249* (2013.01); *G02B 27/108* (2013.01); *G02B 27/123* (2013.01)

(58) Field of Classification Search
None
See application file for complete search history.

(56) References Cited

U.S. PATENT DOCUMENTS 9,229,181 B2 *  1/2016  Kanke ................. G02B 6/4286
2004/0179784 A1 * 9/2004 Vancoille ............. G02B 6/4246
385/47

(Continued)

FOREIGN PATENT DOCUMENTS

JP    2003-060299 A    2/2003
JP    2006-520491 A    9/2006

(Continued)

OTHER PUBLICATIONS

International Search Report (ISR) mailed May 21, 2013, issued for International application No. PCT/JP2013/054103.

*Primary Examiner* — Michelle R Connelly
(74) *Attorney, Agent, or Firm* — Law Office of Katsuhiro Arai

(57) ABSTRACT

An optical receptacle has a configuration wherein light of a light-emitting element is separated into a coupling light and a monitor light by a coupling lens face portion and a monitor lens face portion of a first lens face. The coupling light is reflected by a first reflective surface and then emitted towards an optical transmission body from a coupling light emission surface. The monitor light is reflected by a second reflective surface and then emitted towards a light-receiving surface from a monitor light emission surface.

11 Claims, 13 Drawing Sheets

(56) References Cited

U.S. PATENT DOCUMENTS

| | | | |
|---|---|---|---|
| 2005/0069013 A1* | 3/2005 | Bhandarkar | G02B 6/4204 372/102 |
| 2008/0142815 A1* | 6/2008 | Morioka | G02B 6/4214 257/81 |
| 2009/0154878 A1 | 6/2009 | Noguchi | |
| 2011/0057204 A1* | 3/2011 | Morioka | G02B 6/4214 257/84 |
| 2012/0008899 A1 | 1/2012 | Morioka | |
| 2012/0219300 A1* | 8/2012 | Chen | G02B 6/4246 398/135 |
| 2014/0086579 A1* | 3/2014 | Shao | G02B 6/34 398/38 |
| 2014/0270662 A1* | 9/2014 | Morioka | G02B 6/4214 385/93 |
| 2015/0060640 A1* | 3/2015 | Tanazawa | G02B 6/4214 250/201.1 |
| 2015/0071593 A1* | 3/2015 | Kanke | G02B 6/4286 385/89 |
| 2015/0086165 A1* | 3/2015 | Morioka | G02B 6/4286 385/93 |
| 2015/0338590 A1* | 11/2015 | Morioka | G02B 6/4249 385/33 |
| 2015/0362685 A1* | 12/2015 | Shah | G02B 6/4246 385/89 |

FOREIGN PATENT DOCUMENTS

| | | |
|---|---|---|
| JP | 2009-145656 A | 7/2009 |
| JP | 2011-039151 A | 2/2011 |
| JP | 2012-018363 A | 1/2012 |

\* cited by examiner

OPTICAL RECEPTACLE AND OPTICAL MODULE PROVIDED WITH SAME

This application is the U.S. National Phase under 35 U.S.C. §371 of International Application PCT/JP2013/054103, filed Feb. 20, 2013, which claims priorities to Japanese Patent Application No. 2012-060193, filed Mar. 16, 2012. The International Application was published under PCT Article 21(2) in a language other than English.

TECHNICAL FIELD

The present invention relates to an optical receptacle and an optical module including the optical receptacle. In particular, the present invention relates to an optical receptacle suitable for optically coupling a light-emitting element and an optical transmission body, and an optical module including the optical receptacle.

BACKGROUND ART

Since the past, an optical module has been used in optical communication using optical fibers, the optical module including a light-emitting element such as a surface light-emitting laser (for example, a vertical cavity surface emitting laser, VCSEL).

In this type of optical module, an optical module component referred to as an optical receptacle is used. The optical receptacle is used in optical transmission via optical fiber by light that includes communication information and has been emitted from the light-emitting element being coupled with an end face of the optical fiber.

In addition, heretofore various proposals have been made regarding the optical module to monitor the light (intensity and amount of light) emitted from the light-emitting element, for the purpose of stabilizing output characteristics of the light-emitting element against temperature changes and for adjusting optical output.

For example, Patent Literature 1 proposes a technology in which Fresnel reflection by a reflective/transmissive surface composed of the inner surface of a first recessed section formed in a lens array is used to reflect a portion of the emitted light from the light-emitting element towards a light-receiving element side as monitor light.

PRIOR ART LITERATURE

Patent Literature

Patent Literature 1: Japanese Patent Laid-open Publication No. 2011-039151

DISCLOSURE OF INVENTION

Problem to be Solved by the Invention

In the above-described technology described in Patent Literature 1, the emitted light from the light-emitting element can be separated into the monitor light and coupling light to be coupled with the optical fiber by only the surface shape of the inner surface of the first recessed section. Therefore, there is an advantage in that the number of components required for optical transmission accompanying monitoring can be reduced.

On the other hand, in the technology described in Patent Literature 1, a second recessed section for adjusting the advancing direction of the monitor light after the first recessed section so as to direct towards the light-receiving element side is essential, in addition to surface accuracy (accuracy of slope angle) being required for the inner surface of the first recessed section to suitably couple the coupling light with the optical fiber.

The inventors of the present invention have conducted keen research to achieve further reduction in manufacturing cost and improvement in coupling efficiency, while keeping in mind the advantage of the technology described in Patent Literature 1 that is actualization of separation of the coupling light and the monitor light by a small number of components. The result is the invention of the present application.

The present invention has been achieved in light of the above-described issues. An object of the present invention is to provide an optical receptacle capable of reducing cost and improving coupling efficiency, in addition to acquiring monitor light with certainty, and an optical module including the optical receptacle.

Means for Solving Problem

To achieve the above-described object, an optical receptacle according to a first aspect of the present invention is an optical receptacle that is capable of optically coupling a light-emitting element and an optical transmission body in a state in which the optical receptacle is disposed between a photoelectric conversion device and the optical transmission body, the photoelectric conversion device in which the light-emitting element and a light-receiving element that receives monitor light for monitoring light emitted from the light-emitting element are disposed on a substrate. The optical receptacle includes: a first lens face that is disposed on a first surface on the photoelectric conversion device side in an optical receptacle main body so that the light from the light-emitting element is incident thereon, and separates the incident light of the light-emitting element into a coupling light to be coupled with the optical transmission body and the monitor light; a first reflective surface that is disposed on a second surface on the side opposite to the first surface in the optical receptacle main body so as to oppose the first lens face with a predetermined slope angle in relation to the first surface, at which the coupling light arrives from the first lens face side and that reflects the arrived coupling light towards the optical transmission body side; a coupling light emission surface that emits the coupling light that has been reflected by the first reflective surface towards the optical transmission body; a second reflective surface that is disposed on the second surface in a position on the optical transmission body side in relation to the first reflective surface, at which the monitor light arrives from the first lens face side and that reflects the arrived monitor light towards the light-receiving element side; and a monitor light emission surface that emits the monitor light that has been reflected by the second reflective surface towards the light-receiving element. The first lens face includes: a coupling lens face portion that is disposed so that a portion of light of the light from the light-emitting element is incident thereon, and that advances the incident portion of light towards the first reflective surface as the coupling light; and a monitor lens face portion that is disposed so that the remaining portion of light, other than the portion of light, of the light from the light-emitting element is incident thereon and advances the incident remaining portion of light towards the second reflective surface as the monitor light.

In the invention according to the first aspect, the light of the light-emitting element can be separated into the coupling light and the monitor light by only the surface shape of the first lens face. Therefore, a recessed section requiring planar accuracy, such as that in the past, is no longer required to be formed. The optical receptacle can be designed and manufactured at low cost. In addition, the coupling light that has been separated from the monitor light at the first lens face can be advanced on the optical path within the optical receptacle until the coupling light emission surface is reached via the first reflective surface. Therefore, as long as the accuracy of the first reflective surface is ensured, coupling with the optical transmission body can be performed with high accuracy.

In addition, an optical receptacle according to a second aspect of the present invention is the optical receptacle according to the first aspect in which, further, the coupling lens face portion is formed into a convex surface, and the monitor lens face portion is formed into a concave surface or a sloped plane.

In the invention according to the second aspect, the surface shape of the first lens face can be formed into a shape that is suitable for separation into coupling light and monitor light.

Furthermore, an optical receptacle according to a third aspect of the present invention is the optical receptacle according to the second aspect in which, further, the coupling lens face portion, the monitor lens face portion, and the monitor light emission surface are designed into planar shapes with reference to a common reference plane on the first surface. The first lens face has a stepped surface portion that connects the coupling lens face portion and the monitor lens face portion.

In the invention according to the third aspect, the coupling lens face portion and the monitor lens face portion that configure the first lens face, and the monitor light emission surface can be easily designed with reference to a common reference plane.

Still further, an optical receptacle according to a fourth aspect of the present invention is the optical receptacle according to the third aspect in which, further, the stepped surface portion is disposed in parallel with an optical axis on the first lens face.

In the invention according to the fourth aspect, the effect that the stepped surface, which is unavoidable when the coupling lens face portion, the monitor lens face portion, and the monitor light emission surface are designed with reference to a common reference plane, has on the optical path of the light of the light-emitting element can be minimized.

An optical receptacle according to a fifth aspect of the present invention is the optical receptacle according to the second aspect in which, further, the coupling lens face portion and the monitor lens face portion are connected to each other.

In the invention according to the fifth aspect, the change in shape at the border between the coupling lens face portion and the monitor lens face portion can be smoothened. Therefore, when the optical receptacle is obtained by resin molding using a mold, processing of the shape transfer surface for the first lens face in the mold can be easily performed with high accuracy.

Furthermore, an optical receptacle according to a sixth aspect of the present invention is the optical receptacle according to any one of the first to fifth aspects in which, further, the monitor lens face portion is disposed on the optical transmission body side in relation to the coupling lens face portion.

In the invention according to the sixth aspect, a suitable optical path design for preventing the monitor light from being incident on the first reflective surface can be easily performed.

Still further, an optical receptacle according to a seventh aspect of the present invention is the optical receptacle according to any one of the first to sixth aspects in which, further, the second reflective surface is a total reflection surface on which the monitor light is internally incident at an angle of incidence that is greater than a critical angle and that totally reflects the internally incident monitor light.

In the invention according to the seventh aspect, the second reflective surface can be configured by only the surface shape of the optical receptacle main body. Therefore, the number of components can be reduced.

In addition, an optical receptacle according to an eighth aspect of the present invention is the optical receptacle according to the seventh aspect in which, further, the second reflective surface is formed into a plane or a convex aspherical surface.

In the invention according to the eighth aspect, when the second reflective surface is formed into a plane, further cost reduction can be achieved by simplification of the shape. In addition, when the second reflective surface is formed into a convex aspherical surface, adjustment of the advancing direction of the monitor light is facilitated. Freedom in optical path design and freedom in selection of the placement position of the light-receiving element can be improved.

Furthermore, an optical receptacle according to a ninth aspect of the present invention is the optical receptacle according to the seventh or eighth aspect in which, further, the second reflective surface is composed of at least a portion of an inner bottom surface of a recessed section that is provided recessing on the second surface.

In the invention according to the ninth aspect, a configuration suitable for shielding the second reflective surface (such as attachment of a film onto the second surface) can be actualized to prevent attachment of foreign matter to the second reflective surface that is a total reflection surface.

Still further, an optical receptacle according to a tenth aspect of the present invention is the optical receptacle according to any one of the first to ninth aspects in which, further, the first reflective surface is a total reflection surface on which the coupling light is internally incident at an angle of incidence that is greater than a critical angle and that totally reflects the internally incident coupling light.

In the invention according to the tenth aspect, the first reflective surface can be configured by only the surface shape of the optical receptacle main body. Therefore, the number of components can be reduced.

In addition, an optical receptacle according to an eleventh aspect of the present invention is the optical receptacle according to any one of the first to tenth aspects in which, further, the coupling light emission surface is a second lens face that emits the coupling light while converging the coupling light. The monitor light emission surface is a third lens face that emits the monitor light while converging the monitor light.

In the invention according to the eleventh aspect, coupling efficiency of the coupling light and the monitor light can be improved.

Furthermore, an optical module according to a twelfth aspect of the present invention includes: the optical receptacle according to any one of the first to eleventh aspects; and the photoelectric conversion device according to the first aspect.

In the invention according to the twelfth aspect, the light of the light-emitting element can be separated into the coupling light and the monitor light by the surface shape of the first lens face. Therefore, the optical receptacle can be designed and manufactured at low cost. In addition, the coupling light that has been separated from the monitor light at the first lens face can be advanced on the optical path within the optical receptacle until the coupling light emission surface is reached via the first reflective surface. Therefore, coupling with the optical transmission body can be performed with high accuracy.

Effect of the Invention

In the present invention, in addition to monitor light being acquired with certainty, cost can be reduced and coupling efficiency can be improved.

BEST MODE(S) FOR CARRYING OUT THE INVENTION

An embodiment of an optical receptacle and an optical module including the optical receptacle of the present invention will be described with reference to FIG. 1 to FIG. 29.

Figure 1:
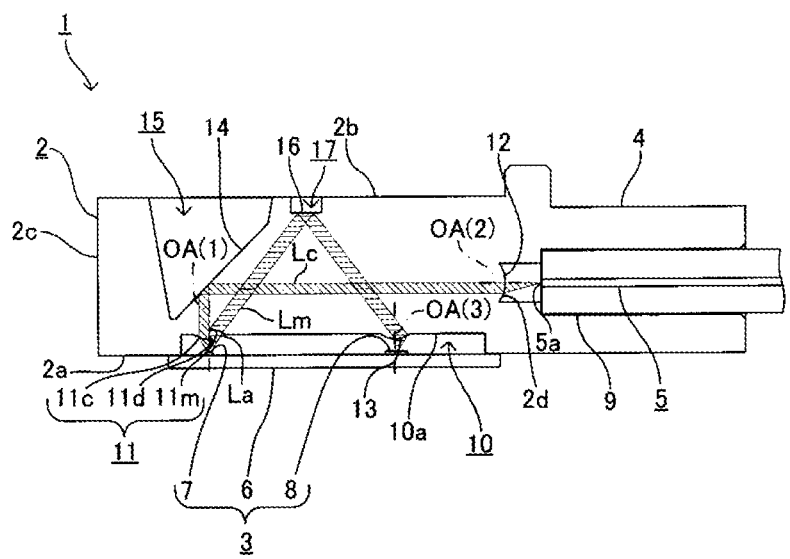
FIG. 1 A schematic configuration diagram of an optical receptacle and an optical module including the optical receptacle according to an embodiment of the present invention FIG. 2 A planar view of the optical receptacle shown in FIG. 1
Figure 2:
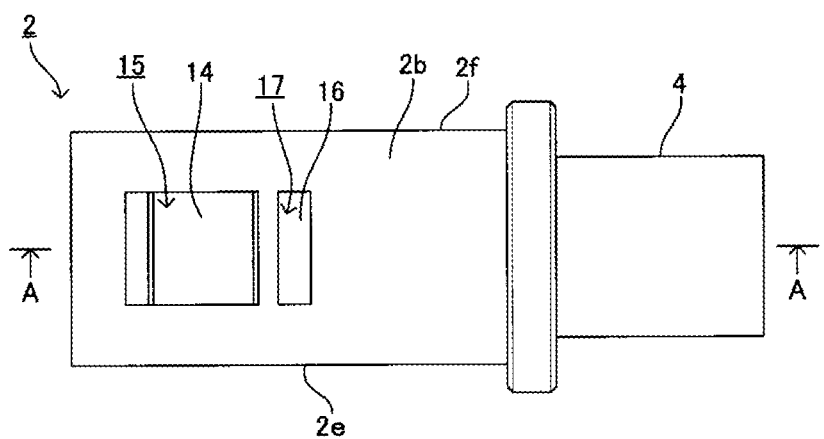
Figure 3:
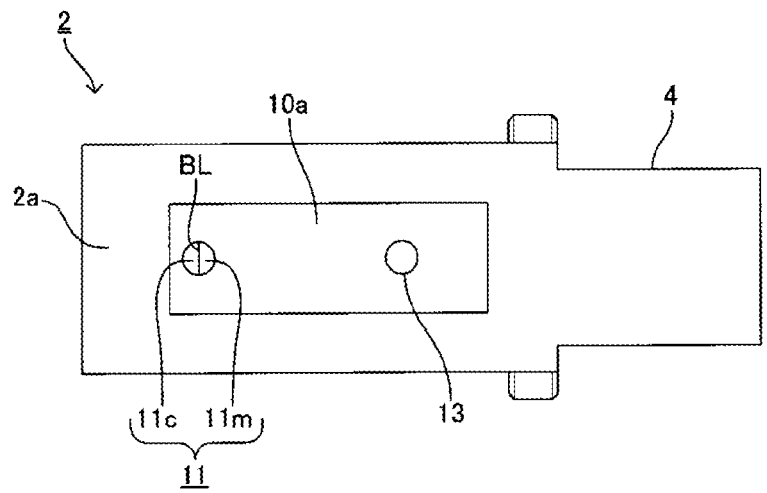
FIG. 3 A bottom view of the optical receptacle shown in FIG. 1

FIG. 1 is a schematic configuration diagram showing an overview of an optical module 1 according to the present embodiment together with a vertical cross-sectional view (corresponding to a cross-sectional view taken along A-A in FIG. 2) of an optical receptacle 2 according to the present embodiment. In addition, FIG. 2 is a planar view of the optical receptacle 2 shown in FIG. 1. Furthermore, FIG. 3 is a bottom view of the optical receptacle 2 shown in FIG. 1.

As shown in FIG. 1, the optical receptacle 2 (optical receptacle main body) according to the present embodiment is disposed between a photoelectric conversion device 3 and an optical fiber 5 that serves as an optical transmission body.

Here, the photoelectric conversion device 3 in FIG. 1 is a substrate-mounted photoelectric conversion device 3. In other words, as shown in FIG. 1, the photoelectric conversion device 3 has a single light-emitting element 7 on a surface (top surface) of a semiconductor substrate (circuit board) 6 on the optical receptacle 2 side, the light-emitting element 7 emitting a laser light La in a direction perpendicular to this surface (upwards). The semiconductor substrate 6 is disposed in parallel with a lower end surface 2a (plane) of the optical receptacle 2 serving as a first surface. The light-emitting element 7 configures the above-described VCSEL. In addition, the photoelectric conversion device 3 has a single light-receiving element 8 on the surface of the semiconductor substrate 6 on the optical receptacle 2 side, in a position to the right of the light-emitting element 7 in FIG. 1, the light-receiving element 8 receiving a monitor light Lm for monitoring output (such as intensity and amount of light) of the laser light La emitted from the light-emitting element 7. The light-receiving element 8 may be a photodetector. Furthermore, electronic components, such as a control circuit that controls the output of the laser light La emitted from the light-emitting element 7 based on the intensity and the amount of light of the monitor Lm received by the light-receiving element 8, are mounted on the surface of the semiconductor substrate 6 on the optical receptacle 2 side (not shown). The electronic components are electrically connected to the light-emitting element 7 and the light-receiving element 8 by wires. The photoelectric conversion device 3 such as this, together with the optical receptacle 2, configures the optical module 1 by, for example, the photoelectric conversion device 3 being attached to the optical receptacle 2 by a known fixing means, such as an adhesive (for example, a thermoset or ultra-violet hardening resin) disposed between the semiconductor substrate 6 and the optical receptacle 2.

In addition, as shown in FIG. 1, a section of the optical fiber 5 on an end face 5a side that has a predetermined length is attachable, together with a circular-cylindrical ferrule 9 that holds this section, within a cylindrical optical fiber attaching section 4 that is formed in the optical receptacle 2. In this attached state, the section of the optical fiber 5 on the end face 5a side (the section housed within the optical fiber attaching section 4) is parallel with the semiconductor substrate 6. The optical fiber 5 may be either a single-mode optical fiber or a multi-mode optical fiber.

In a state in which the optical receptacle 2 is disposed between the photoelectric conversion device 3 and the optical fiber 5 such as those described above, the optical receptacle 2 optically couples the light-emitting element 7 and the end face 5a of the optical fiber 5. The optical receptacle 2 may be manufactured by injection molding using a transmissive resin material, such as polyetherimide.

The optical receptacle 2 will be described in further detail. As shown in FIG. 1, the outer shape of a main section of the optical receptacle 2 having various optical surfaces is formed into a substantially rectangular parallelepiped shape. In other words, as shown in FIG. 1 to FIG. 3, the main section of the optical receptacle 2 configures an overall outer shape by the lower end surface 2a, an upper end surface 2b that serves as a second surface, a left end surface 2c, a right end surface 2d, a front end surface 2e, and a rear end surface 2f. The upper and lower end surfaces 2a and 2b are parallel with each other. In addition, the above-described optical fiber attaching section 4 is formed so as to extend towards the right side from the right end face 2d.

As shown in FIG. 1, a first recessed section 10 is formed on the lower end surface 2a of the optical receptacle 2, the first recessed section 10 having a substantially rectangular cross-sectional shape that recesses upwards in relation to the lower end surface 2a. An inner bottom surface 10a of the first recessed section 10 is formed parallel with the lower end surface 2a. As shown in FIG. 1 and FIG. 3, a single first lens face 11 is formed on the inner bottom surface 10a of the first recessed section 10 in a position near the left end portion in FIG. 1 and FIG. 3.

Figure 4:
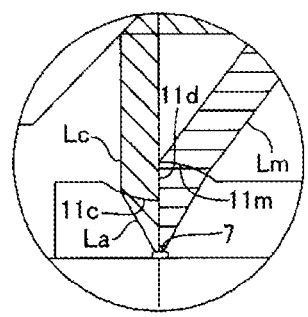
FIG. 4 An enlarged view of a main section of the optical receptacle shown in FIG. 1

Here, as shown in FIG. 3, in the bottom view, the first lens face 11 is formed having a circular (perfectly circular) shape in a state in which the first lens face 11 is divided into two left and right semicircular-shaped divided areas 11c and 11m by a boundary line BL, in the bottom view. In addition, as shown in FIG. 1, in the cross-sectional view, the first lens face 11 is configured so that the divided area 11c on the left side is formed into a convex curve of which the amount of projection towards the photoelectric conversion device 3 side gradually increases as the divided area 11c approaches the side of the divided area 11m on the right side. In addition, the divided area 11m on the right side is formed into a concave curve of which the amount of recessing towards the side opposite to the photoelectric conversion device 3 gradually increases as the divided area 11m approaches the side of the divided area 11c on the left side. Furthermore, the convex curve and the concave curve are shaped so as to be connected by a straight line portion that traverses the curves. The divided area 11c on the left side may be composed of a portion (half portion) of a spherical or aspherical convex lens face. In addition, the divided area 11m on the right side may be composed of a portion (half portion) of a spherical or aspherical concave lens face. In addition, as shown in FIG. 1 and FIG. 4, the divided areas 11c and 11m may be formed having a rotationally symmetrical shape with an optical axis OA(1) on the first lens face 11 as the axis of symmetry. The position of the optical axis OA(1) preferably matches (is positioned at) the center portion of the light-emitting element 7 in the outgoing direction of the laser light La. In addition, the axial direction of the optical axis OA(1) may be perpendicular to the lower end surface 2a.

The divided area 11c on the left side and the divided area 11m on the right side that are formed in this way are respectively a coupling lens face portion 11c involved in optical coupling to the optical fiber 5 and a monitor lens face portion 11m involved in monitoring.

In other words, as shown in FIG. 1 and FIG. 4, in a state in which the photoelectric conversion device 3 is attached to the optical receptacle 2, a portion of laser light La (left-half portion) of the laser light La emitted from the light-emitting element 7 is incident on the coupling lens face portion 11c from below. The coupling lens face portion 11c then converges (for example, collimates) the incident portion of laser light La and advances the portion of laser light La towards an area that is directly above (a first reflective surface 14, described hereafter) on an optical path within the optical receptacle 2, as a fiber coupling light Lc to be coupled with the end face 5a of the optical fiber 5. In addition, at this time, as shown in FIG. 1 and FIG. 4, the remaining portion of laser light La (right-half portion) of the laser light La emitted from the light-emitting element 7, other than the incident light incident on the coupling lens face portion 11c, is incident on the monitor lens face portion 11m from below. The monitor lens face portion 11m then advances the incident remaining portion of laser light La towards an area on the upper right side (a second reflective surface 16, described hereafter) on an optical path within the optical receptacle 2, as a monitor light Lm. In this way, the laser light La that has been incident on the first lens face 11 is separated into the fiber coupling light Lc and the monitor light Lm.

In addition, as shown in FIG. 1 and FIG. 2, the first reflective surface 14 is formed on the upper end surface 2b of the optical receptacle 2 in a position on the advancing direction side of the fiber coupling light Lc in relation to the first lens face 11 (a position directly above in FIG. 1). The first reflective surface 14 has a predetermined slope angle in relation to the lower end surface 2a so as to slope towards the right side as the first reflective surface 14 becomes higher. As shown in FIG. 1, the first reflective surface 14 is composed of only an inner sloped surface of a second recessed section 15 that has a substantially pentagonal cross-sectional shape formed recessing downwards on the upper end surface 2b.

As shown in FIG. 1, the fiber coupling light Lc that has passed through the coupling lens face portion 11c is internally incident (arrives) on the first reflective surface 14, such as that described above, from below (from within the optical receptacle 2) in FIG. 1 at an angle of incidence that is greater than the critical angle. The first reflective surface 14 then totally reflects the internally incident fiber coupling light Lc towards the right side in FIG. 1.

In terms of simplifying design and dimensional accuracy measurement, the slope angle of the first reflective surface 14 may be 45° in the counter-clockwise direction in FIG. 1 with reference to the lower end surface 2a (0°).

Furthermore, as shown in FIG. 1, the right end surface 2d of the main section of the optical receptacle 2 faces the end face 5a of the optical fiber 5. The right end surface 2d is a single second lens face 12 that serves as a coupling light emission surface. The second lens face 12 is formed having a circular outer circumferential shape and is formed into a spherical or aspherical convex lens face of which the convex surface faces the side of the end face 5a of the optical fiber 5. An optical axis OA(2) on the second lens face 12 is preferably disposed on the normal of the center portion of the end face 5a of the optical fiber 5.

As shown in FIG. 1, the fiber coupling light Lc that has been totally reflected by the first reflective surface 14 is internally incident on the second lens face 12, such as that described above. The second lens face 12 then emits the internally incident fiber coupling light Lc towards the side of the end face 5a of the optical fiber 5 while converging the fiber coupling light Lc.

In this way, the fiber coupling light Lc that has been separated from the monitor light Lm at the coupling lens face portion 11c is coupled with the end face 5a of the optical fiber 5.

On the other hand, as shown in FIG. 1 and FIG. 2, the second reflective surface 16 is formed on the upper end surface 2b of the optical receptacle 2 in a position near the optical fiber 5 side (right side) in relation to the first reflective surface 14. The second reflective surface 16 is parallel with the lower end surface 2a and has a rectangular shape in the planar view. As shown in FIG. 1, the second reflective surface 16 is composed of only the inner bottom surface of a third recessed section 17 that has a substantially rectangular cross-sectional shape formed recessing downward at a relatively shallow depth on the upper end surface 2b.

As shown in FIG. 1, the monitor light Lm that has passed through the monitor lens face portion 11m is internally incident (arrives) on the second reflective surface 16, such as that described above, from the lower left side (from within the optical receptacle 2) in FIG. 1 at an angle of incidence that is greater than the critical angle. Then, the second reflective surface 16 totally reflects the internally incident monitor light Lm towards the lower right side in FIG. 1.

In addition, as shown in FIG. 1 and FIG. 3, a third lens face 13 that serves as a monitor light emission surface is formed on the inner bottom surface 10a of the first recessed section 10, in a position to the right of the first lens face 11 and opposing the light-receiving surface 8. As shown in FIG. 1 and FIG. 3, the third lens face 13 forms a circular shape in a bottom view and is formed into a spherical or aspherical convex lens face of which the convex surface faces the light-receiving element 8 side. An optical axis OA(3) on the third lens face 13 may be positioned on a normal of the center portion of the light-receiving surface of the light-receiving element 8.

As shown in FIG. 1, the monitor light Lm that has been totally reflected by the second reflective surface 16 is internally incident on the third lens face 13, such as that described above, from the upper left side (from within the optical receptacle 2) in FIG. 1. The third lens face 13 then emits the internally incident monitor light Lm towards the light-receiving element 8 while converging the monitor light Lm.

In this way, the monitor light Lm that has been separated from the fiber coupling light Lc at the monitor lens face portion 11m is coupled with the light-receiving element 8.

In the above-described configuration, the laser light La of the light-emitting element 7 can be suitably separated into the fiber coupling light Lc and the monitor light Lm by only the surface shape of the first lens face 11. Therefore, a recessed section requiring planar accuracy, such as that in the past, is no longer required to be formed. The optical receptacle 2 can be designed and manufactured at low cost. In addition, the coupling light Lc that has been separated from the monitor light Lm at the first lens face 11 can be advanced on the optical path within the optical receptacle 2 until the second lens face 12 is reached via the first reflective surface 14. Therefore, as long as the accuracy of the first reflective surface 14 is ensured, coupling with the optical fiber 5 can be performed with high accuracy. Furthermore, the first reflective surface 14 and the second reflective surface 16 are both configured by only the surface shapes of the optical receptacle 2 (because the first reflective surface 14 and the second reflective surface 16 are total reflection surfaces). Therefore, the number of components can be reduced. Still further, the second reflective surface 16 is formed into a plane. Therefore, further cost reduction can be achieved by simplification of the shape. In addition, the second reflective surface 16 is formed by the inner bottom surface of the third recessed section 17. Therefore, a measure for preventing attachment of foreign matter onto the second reflective surface 16 that compromises the total reflection function can be easily taken. As an example of such measure, attaching a film that seals the opening of the recessed section 17 on the upper end surface 2b and shielding the second reflective surface 16 can be considered. At this time, the film can obviously be made to reach the peripheral edge portion of the opening of the second recessed section 15 and also shield the first reflective surface 14. Furthermore, in the above-described configuration, as shown in FIG. 1, the monitor lens face portion 11m is disposed on the optical fiber 5 side in relation to the coupling lens face portion 11c. Therefore, a suitable optical path design for preventing the monitor light Lm from being incident on the first reflective surface 14 can be more easily performed compared to when the placement positions of the face portions 11m and 11c are reversed.

In addition to the above-described configuration, according to the present embodiment, the coupling lens face portion 11c, the monitor lens face portion 11m, and the third lens face 13 are designed to have surface shapes with reference to the level (without unevenness) inner bottom surface 10a of the first recessed section 10 as a common reference plane on the lower end surface 2a. Specifically, the coupling lens face portion 11c is designed so as to project towards the photoelectric conversion device 3 side, with the inner bottom surface 10a as a reference plane having an amount of projection that is zero. The monitor lens face portion 11m is designed so as to recess towards the side opposite to the photoelectric conversion device 3, with the inner bottom surface 10a as a reference plane having an amount of recessing that is zero. The third lens face 13 is designed so as to project towards the photoelectric conversion device 3 side, with the inner bottom surface 10a as a reference plane having an amount of projection that is zero. In the configuration such as this, the coupling lens face portion 11c, the monitor lens face portion 11m, and the third lens face 13 can be easily designed with reference to a common reference plane.

In addition, as a result of a design such as this, as shown in FIG. 1 and FIG. 4, a stepped surface portion 11d that connects the coupling lens face portion 11c and the monitor lens face portion 11m is formed between the end portion of the coupling lens face portion 11c on the monitor lens face portion 11m side and the end portion of the monitor lens face portion 11m on the coupling lens face portion 11c side. The stepped surface portion 11d is not involved in optical coupling with the optical fiber 5 or monitoring. However, because the stepped surface portion 11d is formed in parallel with the optical axis OA(1), the stepped surface portion 11d rarely adversely affects (such as by generating stray light) the optical paths of the fiber coupling light Lc and the monitor light Lm.

A reflective film composed of a thin film of a metal (such as Al, Ag, or Au) having high light reflectance may be formed as required on the first reflective surface 14 and the second reflective surface 16. However, when priority is given to reducing the number of components, as described above, a configuration using only total reflection is preferably used.

Various variation examples, such as those described below, may be applied to the present invention.

First Variation Example

Figure 5:
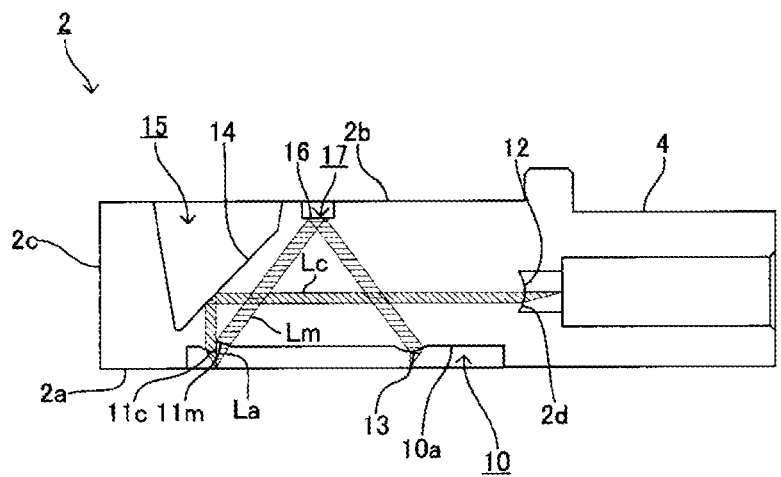
FIG. 5 A vertical cross-sectional view of a first variation example of the present invention FIG. 6 An enlarged view of a main section in FIG. 5
Figure 6:
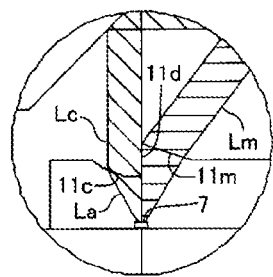

For example, as shown in FIG. 5 and FIG. 6, the monitor lens face portion 11m may be formed into a sloped plane that has a predetermined slope angle in relation to the lower end surface 2a so as to slope towards the side opposite to the photoelectric conversion device 3 as the monitor lens face portion 11m approaches the coupling lens face portion 11c side. In this instance, the monitor lens face portion 11m may be formed into a semicircular shape similar to that in FIG. 3 in the bottom view.

Even in a configuration such as this, as shown in FIG. 5 and FIG. 6, the laser light La that has been incident on the monitor lens face portion 11m can be separated from the fiber coupling light Lc as the monitor light Lm, using refraction. The monitor light Lm can then be advanced towards the second reflective surface 16. Therefore, working effects similar to those of the configuration shown in FIG. 1 to FIG. 4 can be achieved.

Second Variation Example

Figure 7:
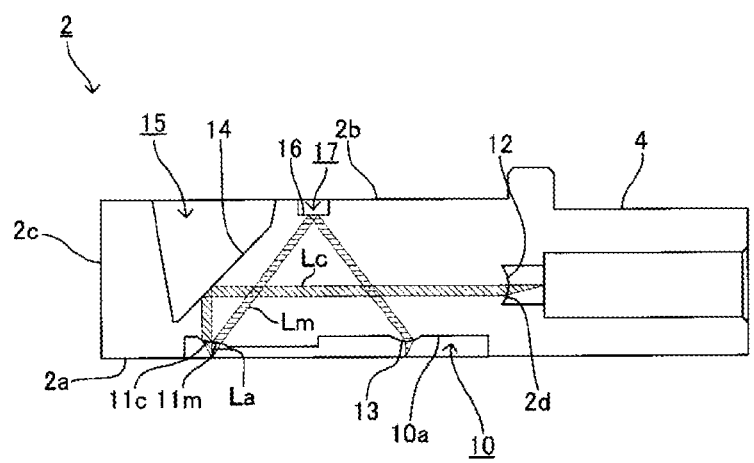
FIG. 7 A vertical cross-sectional view of a second variation example of the present invention FIG. 8 A bottom view of FIG. 7
Figure 8:
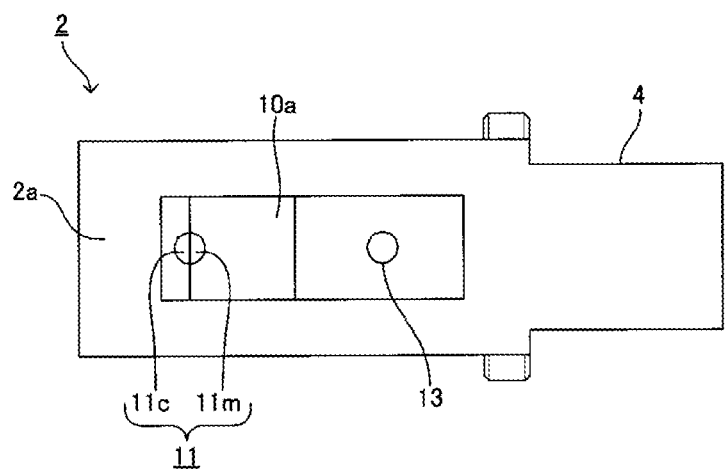
Figure 9:
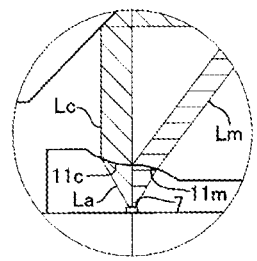
FIG. 9 An enlarged view of a main section in FIG. 7

In addition, as shown in FIG. 7 to FIG. 9, the coupling lens face portion 11c and the monitor lens face portion 11m may be formed so as to be connected to each other.

In the present variation example, the coupling lens face portion 11c and the monitor lens face portion 11m are respectively formed into a convex surface and a concave surface in a manner similar to that in the configuration shown in FIG. 1 to FIG. 4.

In a configuration such as this, the change in shape at the border between the coupling lens face portion 11c and the monitor lens face portion 11m can be smoothened (the stepped surface portion 11d can be eliminated). Therefore, when the optical receptacle 2 is obtained by resin molding using a mold, processing of the shape transfer surface for the first lens face 11 in the mold can be easily performed with high accuracy.

Third Variation Example

Figure 10:
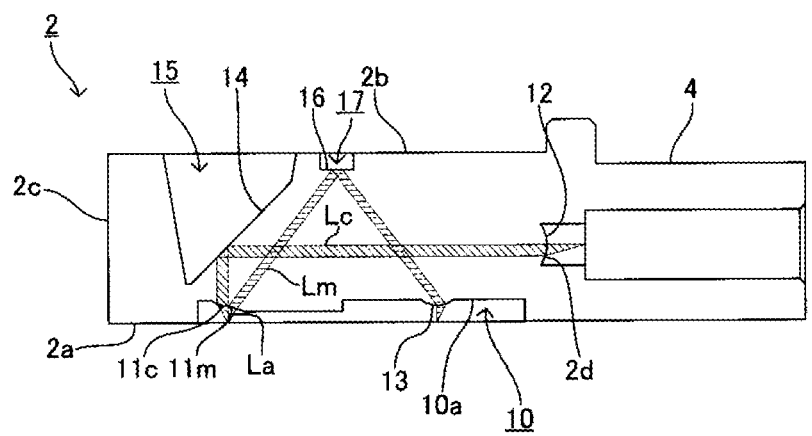
FIG. 10 A vertical cross-sectional view of a third variation example of the present invention FIG. 11 An enlarged view of a main section in FIG. 10
Figure 11:
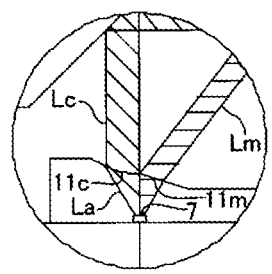

Furthermore, as shown in FIG. 10 and FIG. 11, the first variation example (the monitor lens face portion 11m having a sloped plane shape) and the second variation example (the coupling lens face portion 11c and the monitor lens face portion 11m being connected) can be combined.

Fourth Variation Example

Still further, the light intensity ratio of the fiber coupling light Lc and the monitor light Lm can be adjusted based on a light beam cross-sectional area ratio of the portion of laser light La incident on the coupling lens face portion 11c and the remaining portion of laser light La incident on the monitor lens face portion 11m (area ratio of the cross-sections perpendicular to the optical axis OA(1)). The light beam cross-sectional area can be adjusted by an area ratio of the coupling lens face portion 11c and the monitor lens face portion 11m.

Figure 12:
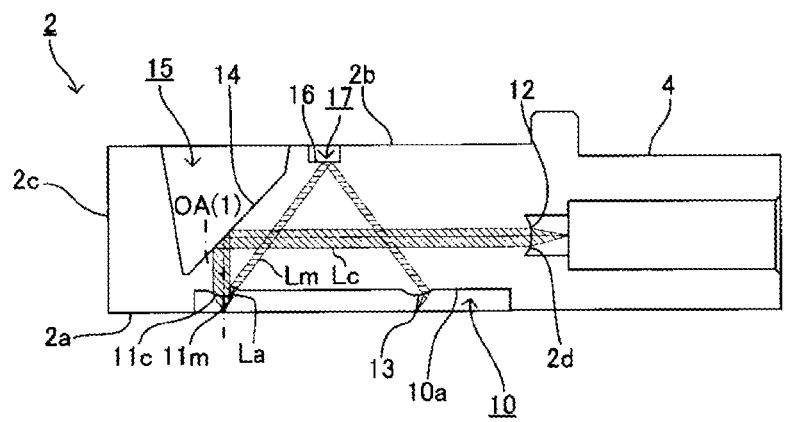
FIG. 12 A vertical cross-sectional view of a fourth variation example of the present invention FIG. 13 An enlarged view of a main section in FIG. 12
Figure 13:
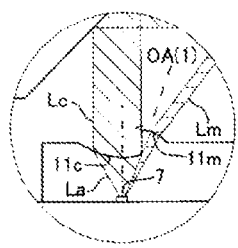

Therefore, when the light intensity of the fiber coupling light Lc is to be increased from that in the configuration shown in FIG. 1 to FIG. 4, for example, as shown in FIG. 12 and FIG. 13, the coupling lens face portion 11c can be formed to be larger than the monitor lens face portion 11m so that the end portion of the coupling lens face portion 11c on the monitor lens face portion 11m side surmounts the optical axis OA(1).

Fifth Variation Example

Figure 14:
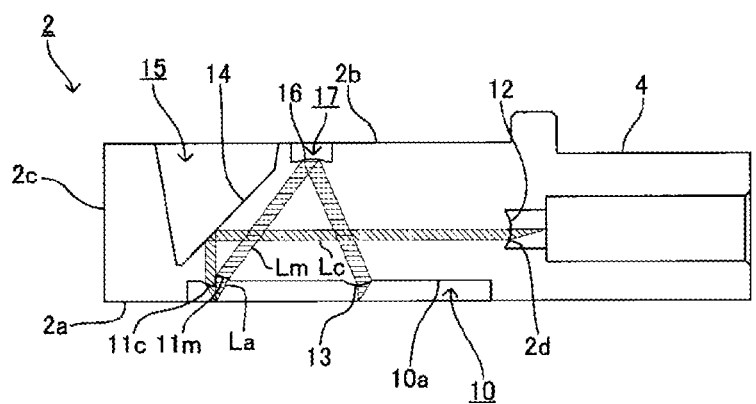
FIG. 14 A vertical cross-sectional view of a fifth variation example of the present invention FIG. 15 A bottom view of FIG. 14
Figure 15:
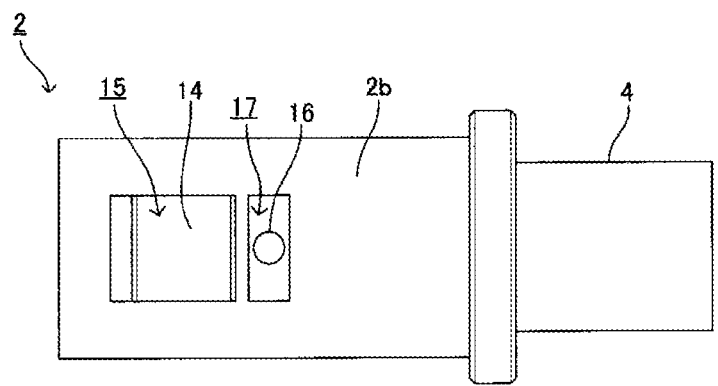
Figure 16:
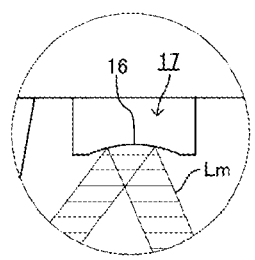
FIG. 16 An enlarged view of a main section in FIG. 14

In addition, as shown in FIG. 14 to FIG. 16, the second reflective surface 16 may be formed into a total reflection surface having a convex aspherical surface shape that forms a portion of the inner bottom surface of the third recessed section 17.

In a configuration such as this, as a result of the angle of incidence of the monitor light Lm in relation to the second reflective surface 16 being adjusted, adjustment of the advancing direction of the monitor light Lm can be facilitated. Freedom in optical path design and freedom in selection of the placement position of the light-receiving element 8 can be improved.

Sixth Variation Example

Figure 17:
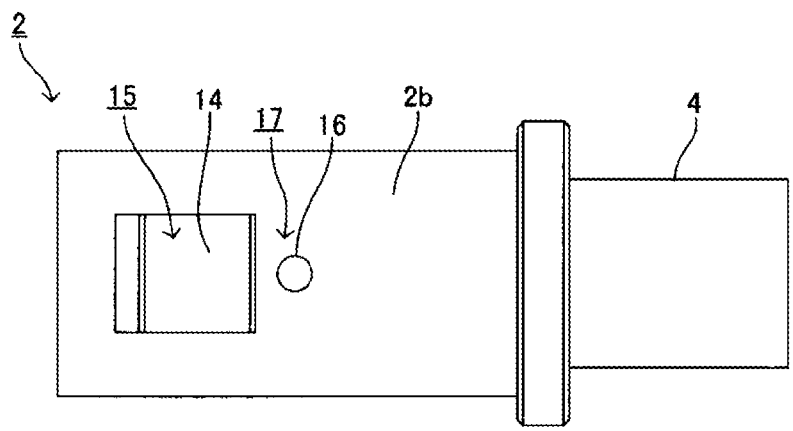
FIG. 17 A first planar view of a sixth variation example of the present invention FIG. 18 A second planar view of a sixth variation example of the present invention FIG. 19 A schematic configuration diagram of the optical module in a seventh variation example of the present invention FIG. 20 A planar view of the optical receptacle shown in FIG. 19
Figure 18:
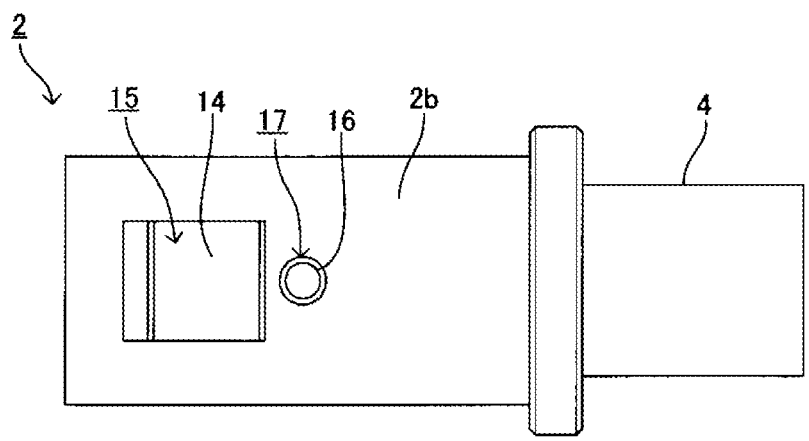

Furthermore, as shown in FIG. 17 and FIG. 18, the inner bottom surface of the third recessed section 17 may be formed into a circular shape.

Seventh Variation Example

Still further, as shown in FIG. 19 to FIG. 22, a configuration that supports multi-channeling of the optical transmission accompanying monitoring is also possible.

Figure 19:
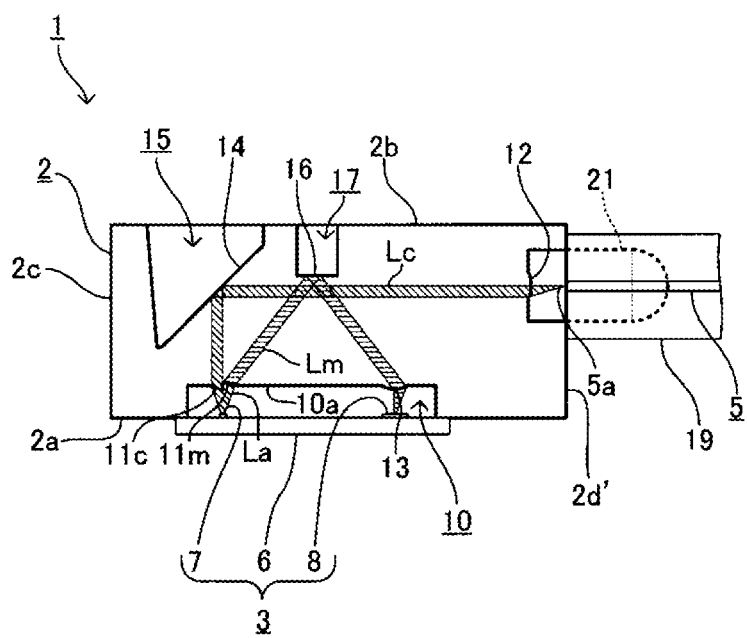
Figure 20:
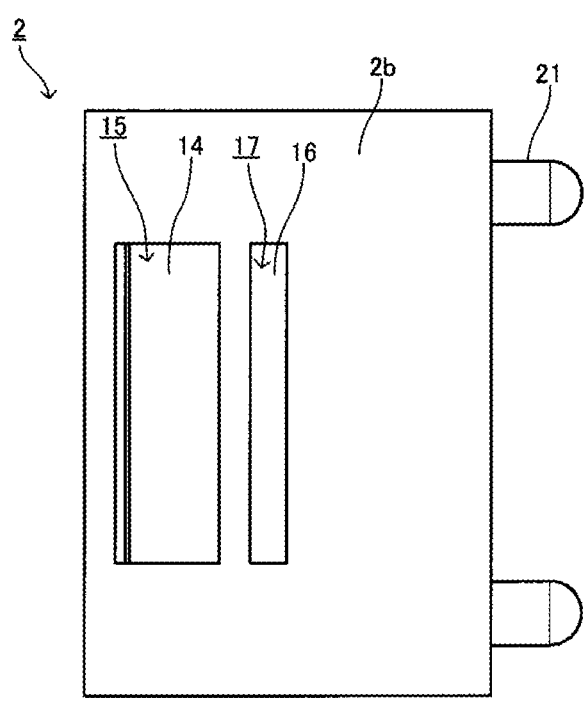
Figure 21:
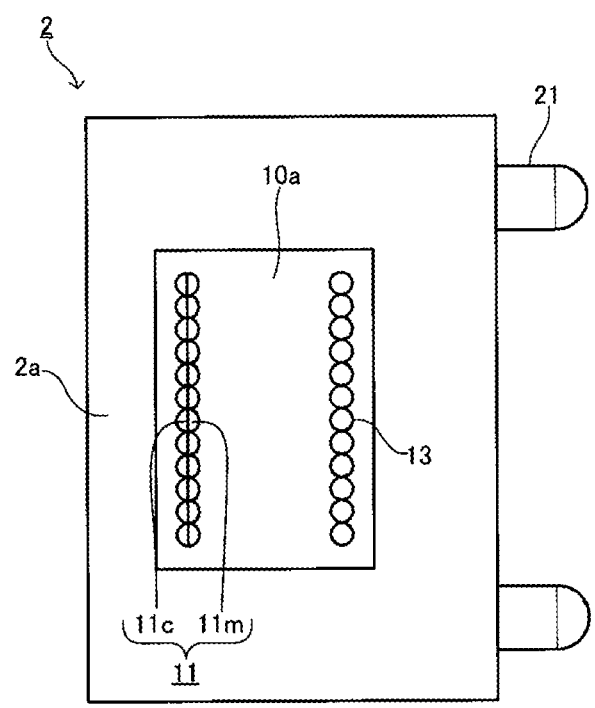
FIG. 21 A bottom view of the optical receptacle shown in FIG. 19
Figure 22:
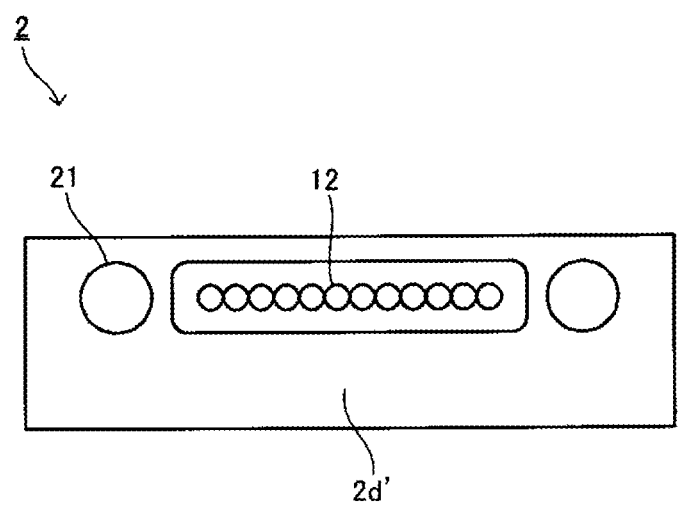
FIG. 22 A right-side view of the optical receptacle shown in FIG. 19

In other words, in the present variation example, the photoelectric conversion device 3 is configured so that a plurality (twelve) of light-emitting elements 7 and a plurality (twelve) of light-receiving elements 8 are each formed in an array in a direction perpendicular to the surface of the paper on which FIG. 19 is printed. In addition, in the present variation example, the same number of optical fibers 5 as the number of light-emitting elements 7 and the number of light-receiving elements 8 are disposed in an array along the same direction as the array direction of the light-emitting elements 7 and the light-receiving elements 8. In FIG. 19, the optical fibers 5 are attached to the optical receptacle 2 by a known attachment means in a state in which the optical fibers 5 are housed within a multi-core integrated connector 19.

In addition, in correspondence to the configurations of the photoelectric conversion device 3 and the optical fibers 5, such as that described above, the optical receptacle 2 is formed so that the dimension in the direction perpendicular to the surface of the paper on which FIG. 19 is printed (vertical dimension in FIG. 20 and FIG. 21) is larger than that of the configuration shown in FIG. 1 to FIG. 4, so that an optical path between each light-emitting element 7 and each optical fiber 5 and an optical path between each light-emitting element 7 and each light-receiving element 8 can be formed. Furthermore, the same number of lens faces 11, lens faces 12, and lens faces 13 as the number of light-emitting elements 7, light-receiving elements 8, and optical fibers 5 are formed in positions respectively corresponding to the light-emitting elements 7, the end faces 5a of the optical fibers 5, and the light-receiving elements 8. Still further, a positioning pin 21 is formed on the right end surface 2d' to determine the attachment position of the optical fibers 5 to the optical receptacle 2 by only a mechanical operation.

In the present variation example, each coupling lens face portion 11c and each monitor lens face portion 11m are respectively formed into a convex surface and a concave surface in a manner similar to that in the configuration shown in FIG. 1 to FIG. 4.

In the present variation example, the laser light La of each light-emitting element 7 can be separated into the fiber coupling light Lc and the monitor light Lm of each light-emitting element 7 by the coupling lens face portion 11c and the monitor lens face portion 11m of each first lens face 11 corresponding to each light-emitting element 7. Therefore, multi-channel optical transmission accompanying monitoring can be actualized at low cost with high accuracy.

Eighth Variation Example

Figure 23:
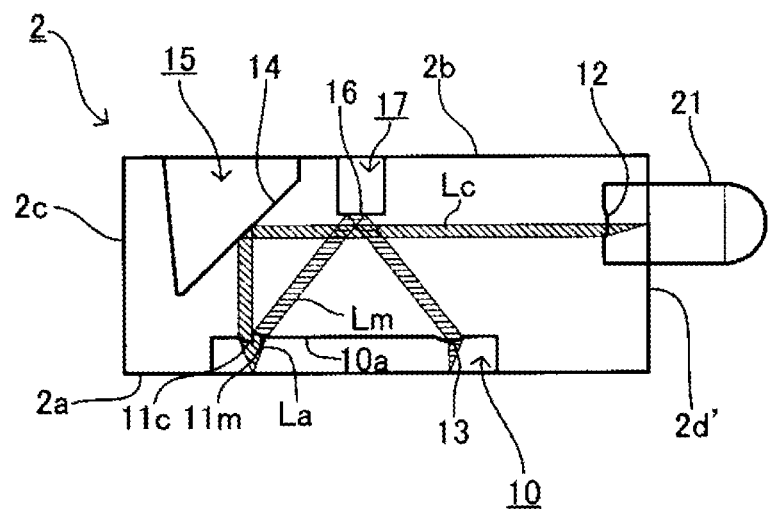
FIG. 23 A vertical cross-sectional view of an eighth variation example of the present invention FIG. 24 A vertical cross-sectional view of a ninth variation example of the present invention FIG. 25 A bottom view of FIG. 24

In addition, as shown in FIG. 23, the first variation example (the monitor lens face portion 11m having a sloped plane shape) and the seventh variation example (multi-channel support) may be combined.

Ninth Variation Example

Figure 24:
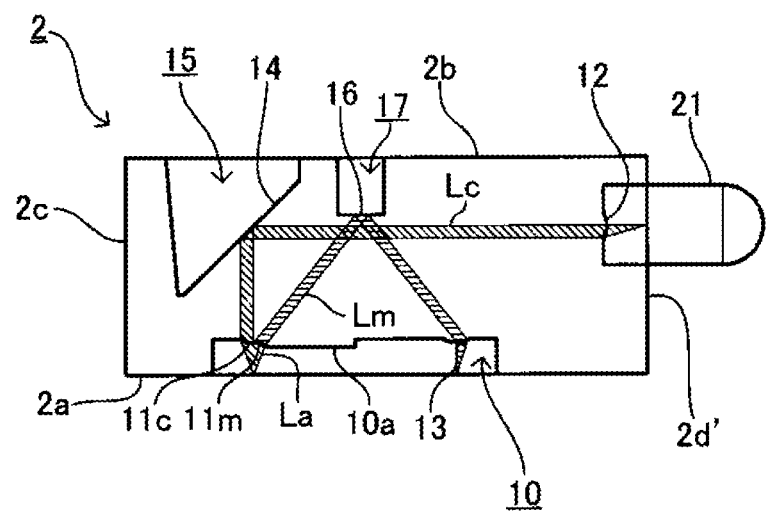
Figure 25:
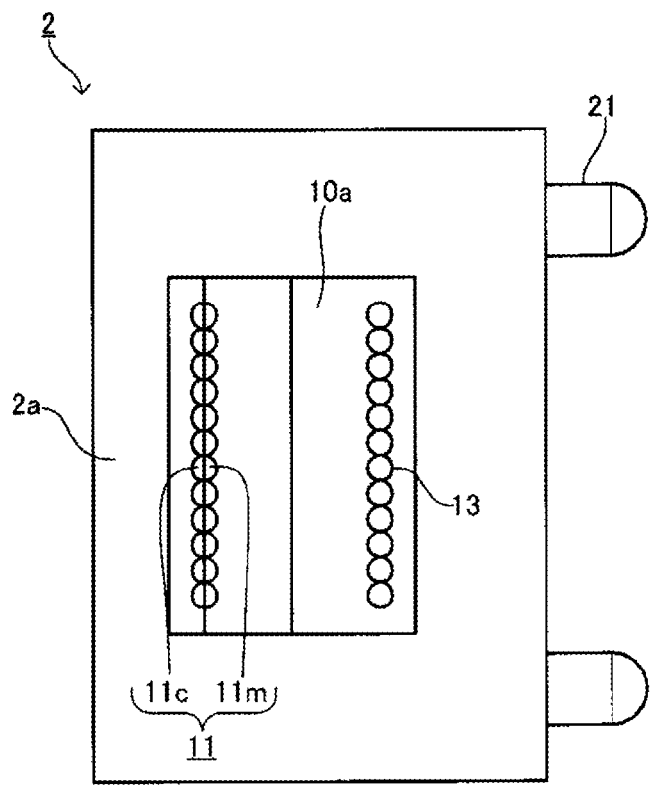

Furthermore, as shown in FIG. 24 and FIG. 25, the second variation example (the coupling lens face portion 11c and the monitor lens face portion 11m having a concave surface shape being connected) and the seventh variation example (multi-channel support) may be combined.

Tenth Variation Example

Figure 26:
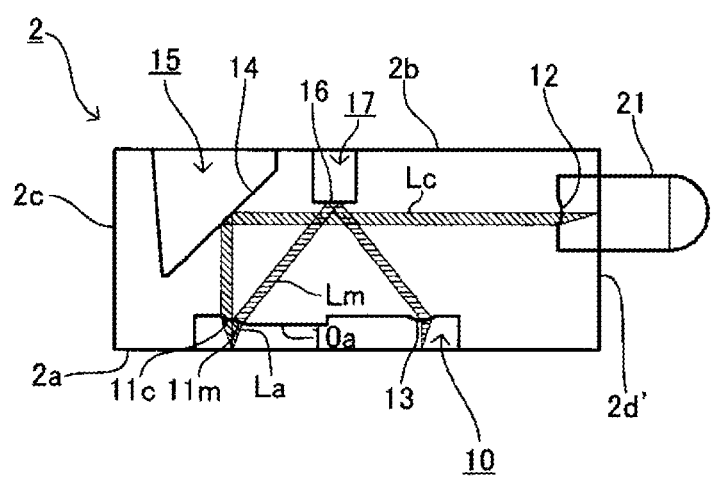
FIG. 26 A vertical cross-sectional view of a tenth variation example of the present invention FIG. 27 A vertical cross-sectional view of an eleventh variation example of the present invention FIG. 28 A vertical cross-sectional view of a twelfth variation example of the present invention FIG. 29 A planar view of FIG. 28

Still further, as shown in FIG. 26, the third variation example (the coupling lens face portion 11c and the monitor lens face portion 11m having a sloped plane shape being connected) and the seventh variation example (multi-channel support) may be combined.

Eleventh Variation Example

Figure 27:
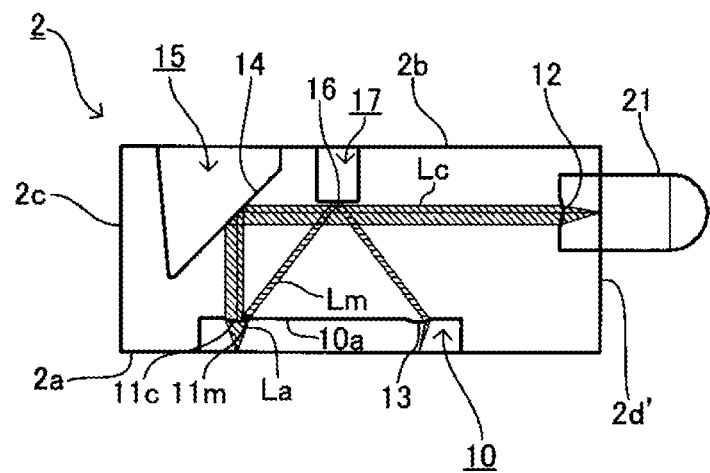

In addition, as shown in FIG. 27, the fourth variation example (adjustment of the amount of light of the fiber coupling light Lc) and the seventh variation example (multi-channel support) may be combined.

Twelfth Variation Example

Figure 28:
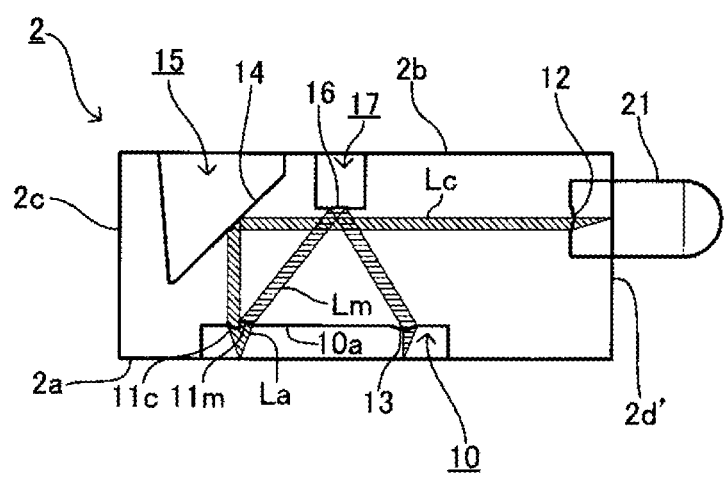
Figure 29:
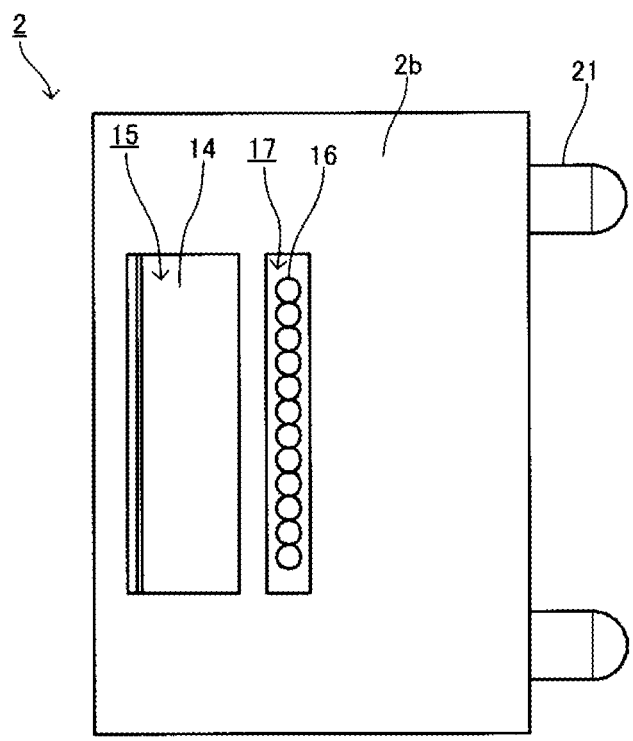

Furthermore, as shown in FIG. 28 and FIG. 29, the fifth variation example (the second reflective surface 16 having an aspherical surface shape) and the seventh variation example (multi-channel support) may be combined.

The present invention is not limited to the above-described embodiment and may be variously modified to the extent that features thereof are not compromised.

For example, an optical transmission body other than the optical fiber 5, such as an optical waveguide may be applied to the present invention.

EXPLANATIONS OF LETTERS OR NUMERALS 1 optical module
2 optical receptacle
3 photoelectric conversion device
5 optical fiber
7 light-emitting element
8 light-receiving element
11 first lens face
11c coupling lens face portion
11m monitor lens face portion
14 first reflective surface
16 second reflective surface

The invention claimed is:

1. A optical receptacle that is capable of optically coupling a light-emitting element and an optical transmission body in a state in which the optical receptacle is disposed between a photoelectric conversion device and the optical transmission body, in which photoelectric conversion device the light-emitting element and a light-receiving element that receives monitor light for monitoring light emitted from the light-emitting element are disposed on a substrate, said optical receptacle comprising:
   a first lens face that is disposed on a first surface on the photoelectric conversion device side in an optical receptacle main body so that the light from the light-emitting element is incident thereon, and separates the incident light of the light-emitting element into a coupling light to be coupled with the optical transmission body and the monitor light;
   a first reflective surface that is disposed on a second surface on the side opposite to the first surface in the optical receptacle main body so as to oppose the first lens face with a predetermined slope angle in relation to the first surface, at which the coupling light arrives from the first lens face side, and that reflects the arrived coupling light towards the optical transmission body side;
   a coupling light emission surface that emits the coupling light that has been reflected by the first reflective surface towards the optical transmission body;
   a second reflective surface that is disposed on the second surface in a position on the optical transmission body side in relation to the first reflective surface, at which the monitor light arrives from the first lens face side, and that reflects the arrived monitor light towards the light-receiving element side; and
   a monitor light emission surface that emits the monitor light that has been reflected by the second reflective surface towards the light-receiving element,
   wherein the first lens face includes:
      a coupling lens face portion that is disposed so that a portion of light of the light from the light-emitting element is incident thereon, and that advances the incident portion of light towards the first reflective surface as the coupling light, and
      a monitor lens face portion that is disposed so that the remaining portion of light, other than the portion of light, of the light from the light-emitting element is incident thereon and advances the incident remaining portion of light towards the second reflective surface as the monitor light, wherein:
   the coupling lens face portion is formed into a convex surface, and
   the monitor lens face portion is formed into a concave surface or a sloped plane.

2. The optical receptacle according to claim 1, wherein:
   the coupling lens face portion, the monitor lens face portion, and the monitor light emission surface are designed into planar shapes with reference to a common reference plane on the first surface; and
   the first lens face has a stepped surface portion that connects the coupling lens face portion and the monitor lens face portion.

3. The optical receptacle according to claim 2, wherein:
the stepped surface portion is disposed in parallel with an optical axis on the first lens face.

4. The optical receptacle according to claim 1, wherein:
the coupling lens face portion and the monitor lens face portion are connected to each other.

5. The optical receptacle according to claim 1, wherein:
the monitor lens face portion is disposed on the optical transmission body side in relation to the coupling lens face portion.

6. The optical receptacle according to claim 1, wherein:
the second reflective surface is a total reflection surface on which the monitor light is internally incident at an angle of incidence that is greater than a critical angle and that totally reflects the internally incident monitor light.

7. The optical receptacle according to claim 6, wherein:
the second reflective surface is formed into a plane or a convex aspherical surface.

8. The optical receptacle according to claim 6, wherein:
the second reflective surface is composed of at least a portion of an inner bottom surface of a recessed section that is provided recessing on the second surface.

9. The optical receptacle according to claim 1, wherein:
the first reflective surface is a total reflection surface on which the coupling light is internally incident at an angle of incidence that is greater than a critical angle and that totally reflects the internally incident coupling light.

10. The optical receptacle according to claim 1, wherein:
the coupling light emission surface is a second lens face that emits the coupling light while converging the coupling light; and
the monitor light emission surface is a third lens face that emits the monitor light while converging the monitor light.

11. An optical module comprising:
the optical receptacle according to claim 1; and
the photoelectric conversion device in which the light-emitting element and the light-receiving element that receives monitor light for monitoring light emitted from the light-emitting element are disposed on the substrate.

* * * * *